H. E. SLAGEL.
WIND WHEEL OR WIND DRIVEN PRIME MOVER.
APPLICATION FILED MAY 4, 1917.
1,300,499.
Patented Apr. 15, 1919.
2 SHEETS—SHEET 1.
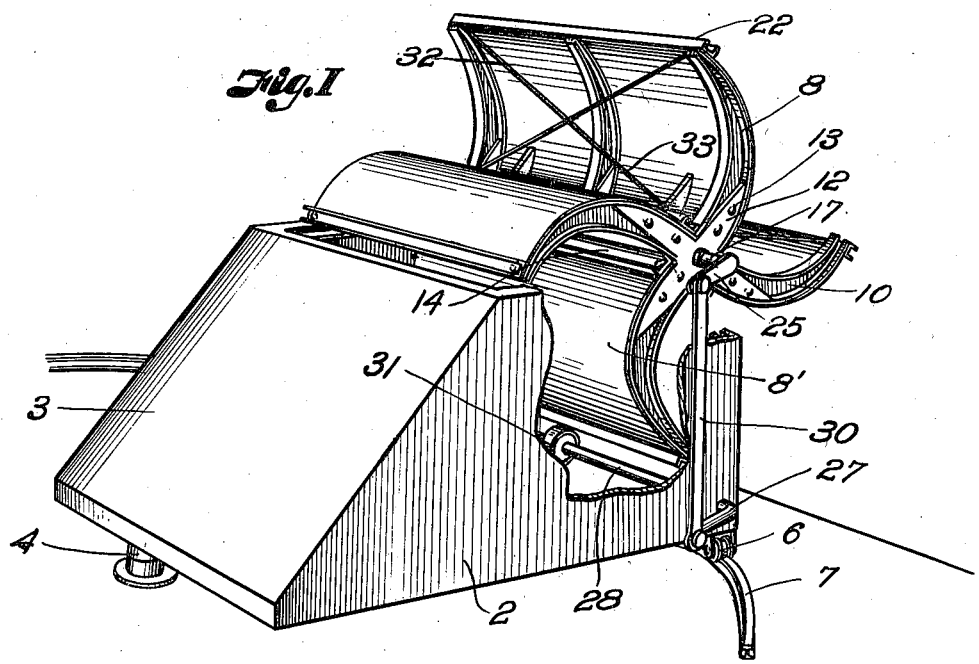
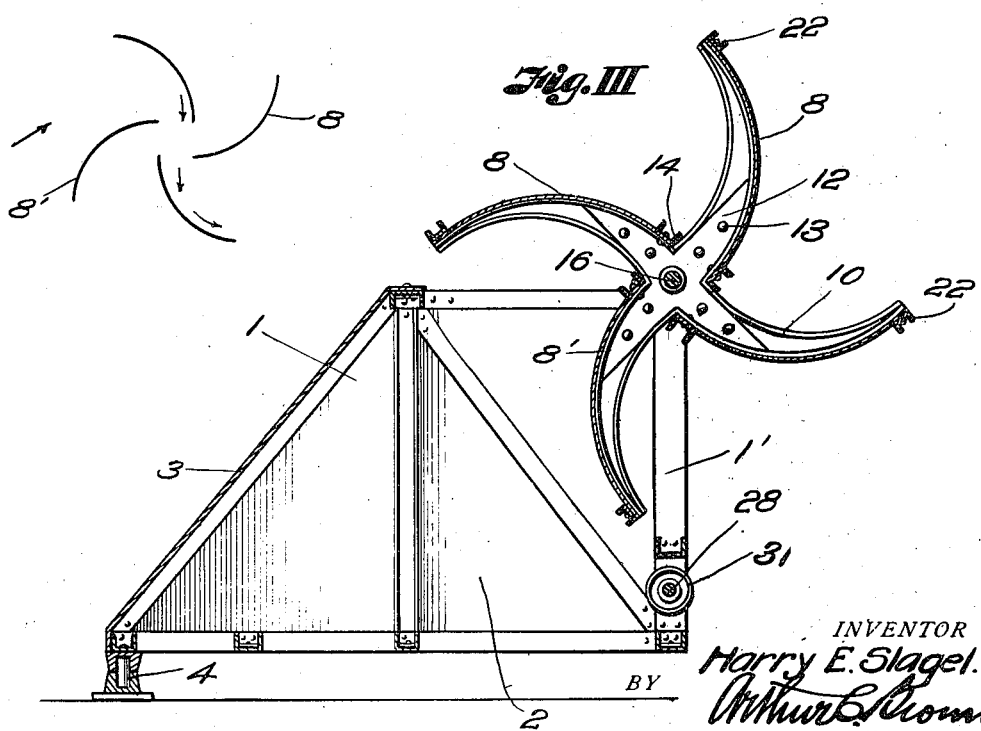
INVENTOR
Harry E. Slagel.
BY
ATTORNEY H. E. SLAGEL.
WIND WHEEL OR WIND DRIVEN PRIME MOVER.
APPLICATION FILED MAY 4, 1917.
1,300,499.
Patented Apr. 15, 1919.
2 SHEETS—SHEET 2.
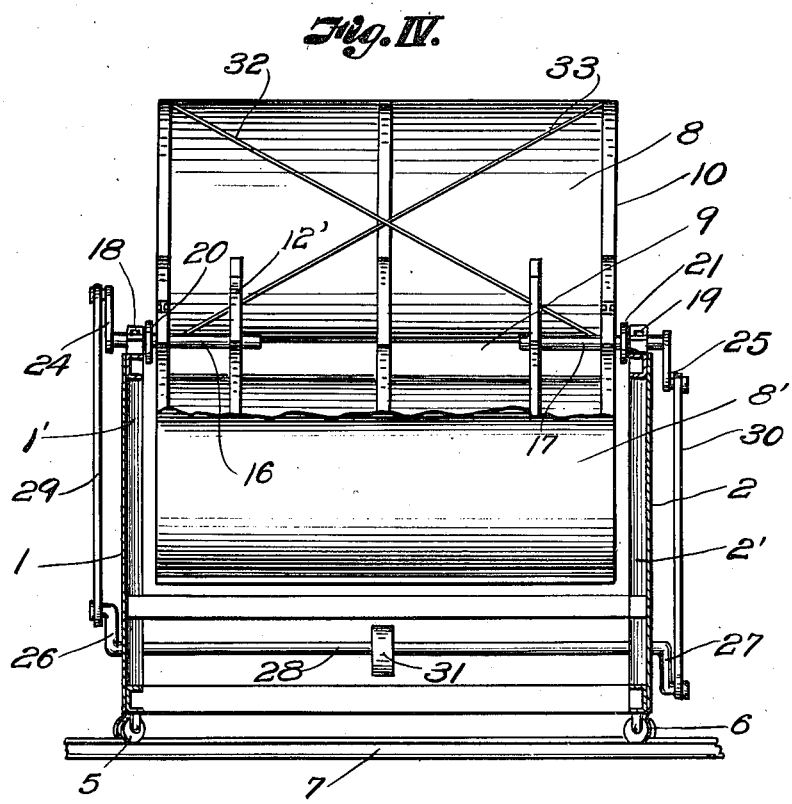
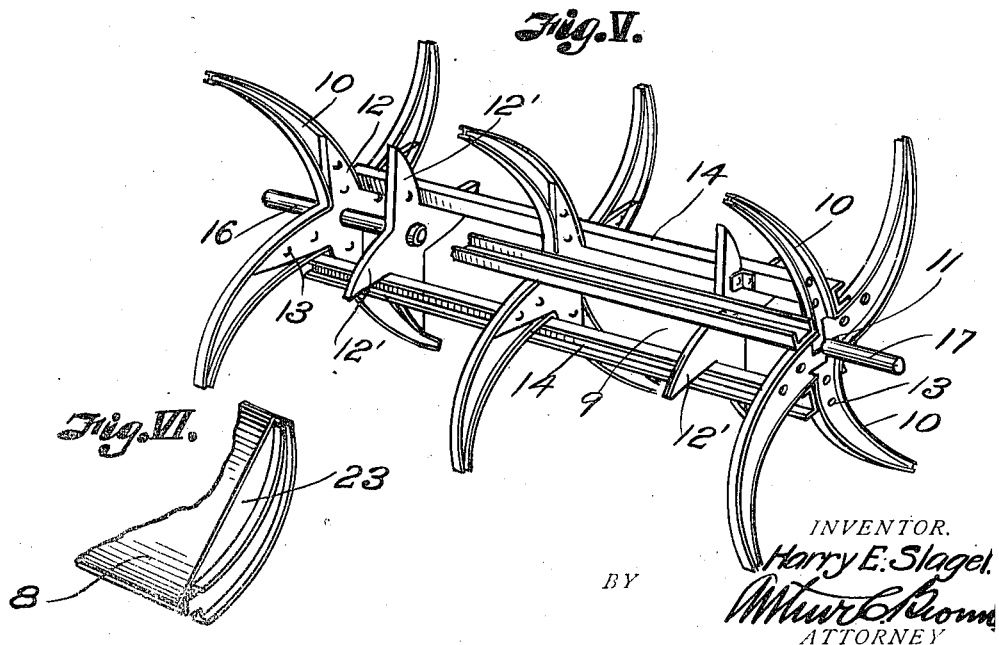
INVENTOR.
Harry E. Slagel.
BY
ATTORNEY

UNITED STATES PATENT OFFICE.

HARRY E. SLAGEL, OF SCOTT CITY, KANSAS.

WIND-WHEEL OR WIND-DRIVEN PRIME MOVER.

1,300,499. Specification of Letters Patent. Patented Apr. 15, 1919.

Application filed May 4, 1917. Serial No. 166,350.

*To all whom it may concern:*

Be it known that I, HARRY E. SLAGEL, a citizen of the United States, residing at Scott City, in the county of Scott and State of Kansas, have invented a certain new, useful, and Improved Wind-Wheel or Wind-Driven Prime Mover, of which the following is a specification.

This invention relates to wind wheels and one of the objects of the invention is to provide a wind wheel of approved construction capable of receiving the maximum amount of energy from wind blowing at a given velocity. Another object of the invention is to provide a wind wheel and a support therefor so constructed that the wind wheel will be mechanically presented in a position to receive the full force or impact of the wind from whatever direction the wind happens to be blowing.

A further important object of my invention is to provide a wind wheel with vanes adapted to act as action and reaction vanes, that is to say, to so construct the wind wheel that the initial energy due to the velocity of the wind will be absorbed by a blade or blades and that further energy will be provided to be absorbed by redirecting the previously used current of wind onto another blade or blades in which a reaction takes place, in such a manner that power is applied to the wind wheel in excess of that which would be possible where the wind is directed upon the single blade surfaces only.

A further important object of my invention is to provide a wind wheel of such construction as to permit its being built in very large sizes.

In carrying out my invention, I prefer to construct the wind wheel with a plurality of rigid radially disposed blades having curved impact surfaces which alternately serve as action and reaction surfaces and to rigidly arrange these blades about a central unobstructed opening, whereby the air from the impact surfaces may pass unimpeded past and through the axis of the wind wheel to the reaction surfaces so that loss of energy due to the deflected or reversed air current having to travel farther than the shortest distance possible will be eliminated.

I also prefer to arrange a wind break or shield to protect the return surfaces of the wind wheel from opposition by the blowing wind and in actual practice I prefer to arrange the wheel as an overshot wheel although as the nature of the invention is better understood it will be obvious that it may be used in various other ways if desired.

In the drawings:

Figure I is a perspective view of a wind wheel constructed in accordance with my invention, a part of a standard and a part of the side of the wind break being broken away to show the details of the wind wheel, etc.

Fig. II is a diagrammatic view of the vane arrangement.

Fig. III is a cross-sectional view through the wind wheel and through the wind break.

Fig. IV is a front end view of the wind wheel, the wind break being shown in section.

Fig. V is a fragmentary perspective view of the wind wheel frame showing the hub construction with the hub braces, the tip braces for the vane ribs being omitted, and Fig. VI is a fragmentary detail perspective view of one end of a modified form of vane.

I will now describe the parts in detail, it being understood that changes in form, proportion and minor details of construction may be resorted to without departing from the principle or spirit or scope of the invention or sacrificing any of its advantages.

In the form shown for the purpose of illustration, the supporting frame is provided with the sides 1 and 2 which are provided with enough covering to serve as vanes by which the wind may revolve the support for the wind wheel about a fixed point 4 and the inclined end 3 which serves as a wind break or shield as will be explained hereinafter. The supporting frame is shown as pivoted at 4 and provided with end supporting casters or rollers 5 and 6 adapted to travel over a circular track or rail 7. The wind wheel is shown as comprising a plurality of concavo-convex blades arranged in pairs 8 and 8' and supported about a hub having a central unobstructed opening 9. The hub and supporting frame are best shown in Fig. V as comprising the radially disposed vane ribs or arms 10 which are preferably of I-beam form in cross section and for the sake of simplicity and cost I prefer to make each rib or arm 10 as a separate piece and to provide said arms with interlocking shoulders 11 whereby they may be easily assembled, said arms being easily connected together by means of the crosses or star-shape braces 12 engaging the webs on opposite sides and through which rivets or other fastening devices 13 may project. Near the center of the frame are longitudinally arranged hub forming braces 14 fastened to the flanges and webs of the respective ribs and these braces 14 are preferably in the form of channels as shown for wheels having less than six vanes, these braces 14 being adapted to be additionally braced by braces 12' through which the channels fit, said braces 12' being spaced from but in line with those braces designated 12. The braces 12' serve as strengthening devices for the hub and also serve as anchor devices or fastening means for the stub shafts 16 and 17 adapted to be received in the bearings 18 and 19 in the standards 1' and 2' at the rear corners of the supporting frame, said shaft carrying spacing collars 20 and 21 whereby the wind wheel frame may be properly centered with respect to its supporting frame so as to prevent rubbing of the standards 1' and 2' or of the walls 1 and 2 by means of the end of the wheel. From the construction thus far described it will be apparent that the hub serves the purpose of the shaft for the wheel with a two-fold advantage, that the built-up frame constituting the hub serves both to strengthen the wheel and to provide an unobstructed center opening devoid throughout the major portion of its length of a shaft so that the air may pass unimpeded from the action surfaces to the reaction surfaces of the wheel. In order to afford additional strength for the wheel, I have provided tip braces 22 extending from tip to tip on the ribs or arms 10 as best seen in Figs. I and III and these may also serve as fastening means for the sheets 8 and 8' which constitute the vanes of the wheel. In Fig. VI, I have shown a slightly modified form of vane and support in which an end baffle plate 23 may be employed but this may be omitted if desired.

On the end of the shafts 16 and 17 I have shown cranks 24 and 25 which are connected to the cranks 26 and 27 of the driven shaft 28 by the links 29 and 30, the shaft 28 being provided with a power pulley 31. The method of transmitting the power from the wheel to the shaft 28 or its equivalent is merely illustrative, it being obvious that chains, belts, gearing or the like may be substituted if desired.

The surfaces of the vanes 8 and 8' may partake of any curvature, for example from 22½° to 180°. I find that an angle of about 90° gives very efficient service and in actual practice I prefer to employ the blades in pairs as shown although a greater or lesser number than is shown may be employed and the number may be an even or an odd number with satisfactory results. Where desirable, cross braces 32 and 33 may be used to give additional rigidity to the wind wheel.

When those parts comprising the wind wheel itself are assembled as shown there are four separate actions whereby energy is imparted to the wind wheel; that is, first, by the direct action of the wind against the concave face of the vane; second, by the action of partially reversing the direction of the wind; third, by the action of the partially reversed air current against the concave face of the vane that is returning toward the wind with its convex face exposed to the wind, and, fourth, by the action of again partially reversing the previously partially reversed wind current which is accomplished by the concave face of the vane that is returning toward the wind with its convex face exposed to the wind.

The wind break shown for the purpose of defending the returning vanes from the action of the wind may be omitted if for any reason it is desirable to do so, the actions and reactions in the wind wheel not being affected by the presence or absence of said wind break.

When all the parts are assembled as shown, the wind may travel against the concave surfaces of the blades above the wind break 3, the supporting frame moving around until the wind wheel is head-on with respect to the wind. The wind will first come in contact with the surfaces above the wind break as shown in Fig. II where direct action will take place. Some of the velocity will be abstracted from the wind in the form of energy and the wind will then be deflected through the unobstructed open space in the hub onto an opposite blade shielded by the wind break where additional velocity will be abstracted by reaction to impart additional energy to the wheel. The air in the space traveled by the returning vanes will be substantially still air, that is, there will be a minimum movement of the air and also the only force opposing the movement of the returning blade will be the weight of the air displaced as the blade moves through space, that is, there will be no pushing against the pressure of the atmosphere (creating a vacuum) by the returning vanes, because a surplus of air is forced against their concave reaction sides. Therefore, it will be apparent that the maximum available amount of energy will be taken out of a wind having a given velocity. It will further be apparent that the wind wheel is strong, durable, simple in construction and that it is well adapted to serve the purpose for which it is intended.

The wind wheel of this invention is intended to be made of metal throughout.

The ribs 10, the crosses 12 and 12' and the center or hub-braces 14, may all be made of framework bracing if the wind wheel is to be made large, also as may sets of ribs 10, and as many of the cross-arm braces 12' as are necessary may be used.

The framework for supporting the wind wheel may be weighted down enough to prevent its bouncing up and down on the track or rail if the action of the wind on the wind wheel is jerky or has a tendency to cause said up and down movement.

The framework for supporting the wind wheel would be best if made principally or entirely of metal.

Fly wheels may be attached to the stub shafts 16 and 17 if desirable or necessary.

The vanes for this wind wheel may be made up of pluri-angled surfaces instead of regular or irregular curved surfaces, if it is desirable to do so.

Having thus described my invention, what I claim as new therein and desire to secure by Letters Patent is:—

1. A wind wheel comprising a frame having radially disposed arms arranged about a common center, braces connecting said arms, stub shafts carried by the arms and braces, longitudinally arranged U-beams connecting said arms near the center, braces connecting the tips of said arms and vanes carried by said arms.

2. A wind wheel comprising a frame having radially disposed arms arranged at the end of the frame about a common center, braces connecting said arms, stub shafts carried by the arms and braces, longitudinally arranged beams, connecting said arms near the center, braces connecting the tips of said arms, and vanes carried by said arms.

3. A wind wheel comprising a frame having radially disposed arms, arranged at the end of the frame about a common center, braces connecting said arms, stub shafts carried by the arms and braces, longitudinally arranged beams connecting said arms near the center, braces connecting the tips of said arms, vanes carried by said arms, and diagonal brace wires connected to the tip of one arm and to the base of another arm.

4. A wind wheel comprising a frame having radially disposed arms arranged at the end of the frame about a common center, braces connecting said arms, stub shafts carried by the arms and braces, longitudinally arranged beams connecting said arms, braces between the longitudinally arranged beams and having ends extending radially therefrom, and vanes connected to the arms and abutting against the edges of the radially projecting ends of the braces.

5. A wind wheel comprising a frame having radially disposed arms arranged at the ends of the frame about a common center, stub shafts carried by the arms and braces, vanes connected to the arms, longitudially arranged beams connecting the arms, and braces connecting the outer ends of the arms.

6. A wind wheel comprising a frame having radially disposed arms arranged about a common center and extending radially therefrom, braces connecting said arms, stub shafts carried by said arms and braces, vanes connected to said arms, and diagonal brace wires, each connected to a tip of one arm and to the base of another.

In testimony whereof I affix my signature in the presence of two subscribing witnesses.

HARRY E. SLAGEL.

Witnesses:
 CARL M. STARR,
 C. W. PROUDFOOT.